April 20, 1954 R. M. M. OBERMAN ET AL 2,676,210

POTENTIAL COMPARING SELECTOR CIRCUIT

Filed July 28, 1949 4 Sheets-Sheet 1

INVENTORS
ROELOF MAARTEN MARIE OBERMAN
ANTONIE SNIJDERS
BY ROBERT BERTOLD BUCHNER

AGENT.

April 20, 1954 R. M. M. OBERMAN ET AL 2,676,210

POTENTIAL COMPARING SELECTOR CIRCUIT

Filed July 28, 1949 4 Sheets-Sheet 2

INVENTORS.
ROELOF MAARTEN MARIE OBERMAN
ANTONIE SNIJDERS
BY ROBERT BERTOLD BUCHNER

AGENT.

INVENTORS.
ROELOF MAARTEN MARIE OBERMAN
ANTONIE SNIJDERS
BY ROBERT BERTOLD BUCHNER
AGENT.

April 20, 1954 R. M. M. OBERMAN ET AL 2,676,210

POTENTIAL COMPARING SELECTOR CIRCUIT

Filed July 28, 1949 4 Sheets-Sheet 4

INVENTORS.
ROELOF MAARTEN MARIE OBERMAN
ANTONIE SNIJDERS
BY ROBERT BERTOLD BUCHNER
[signature]
AGENT.

Patented Apr. 20, 1954 2,676,210

UNITED STATES PATENT OFFICE 2,676,210

POTENTIAL COMPARING SELECTOR CIRCUIT

Roelof Maarten Marie Oberman, Antonie Snijders, and Robert Bertold Buchner, Eindhoven, Netherlands, assignors to Hartford National Bank and Trust Company, Hartford, Conn., as trustee Application July 28, 1949, Serial No. 107,316

Claims priority, application Netherlands August 11, 1948

16 Claims. (Cl. 179—18)

This invention relates to circuit arrangements for the relative comparison of two potentials and, more particularly, for the indication of the relative equality of these potentials.

Such devices are sometimes termed zero switches and are used inter alia in automatic telephone systems according to a voltage-comparison method, for example a bridge marking method for controlling the adjustment of selectors, call finders or the like.

In systems of this kind, outlets of a switch are marked by an electric potential which is characteristic for each outlet or for a group of outlets. During the motion of the switch these marking potentials are compared, by a zero-voltage testing device, with a comparison potential adjusted in the register in accordance with the number to be selected. As soon as an idle outlet is found, the marking potential of which is equal to the comparison potential in the register, the testing device responds and a relay is energized or de-energized, so that the switch is held.

Zero-voltage testing devices are known comprising one or more electric discharge tubes. The known arrangements, however, have several limitations. In some devices each zero-switch must be provided with a supply of its own, which must be insulated from earth. In other systems the supply current of the discharge tubes passes over the test wiper of the switch and through the resistances through which the marking potential is supplied to the marking contact, so that the marking potentials are modified to a greater or smaller extent. This may result in disturbances, more particularly during the simultaneous adjustment of a plurality of selectors, and is even not permissible in certain systems.

The present invention obviates these limitations and provides a solution in which several zero switches are adapted to be fed from a common supply connected to earth the voltage testing operation being effected without drawing current.

The invention is characterized in that the voltages to be compared are fed to control-electrodes of two discharge tubes ("comparison tubes"), the common cathode circuit of which comprises a high resistance, and in that a relay circuit is provided which responds and energizes or de-energizes a relay if the potentials to be compared are equal or substantially equal. The control-voltage of the relay circuit is taken from the anode circuit of at least one of the tubes.

It is known per se in push-pull amplifiers to include a resistance in the common cathode circuit of the amplifying tubes so that the anode currents of the tubes vary equally and in phase-opposition, thus improving the push-pull effect and reducing distortion.

The resistance across the input terminals of the circuit-arrangement according to the invention is very high, so that the circuit does not constitute a load for the testing circuits coupled with the circuit-arrangement, in spite of the load constituted by the relay circuit in the output of the circuit.

The circuit-arrangement translates the input criterion, i. e. the difference between the potentials to be compared, into an output criterion in the anode circuits of the comparison tubes, the relay circuit being capable of translating this output criterion in various ways for obtaining the desired indication. The output criterion depends solely upon the difference between the potentials to be compared, and not upon the potentials themselves.

If the common cathode resistance of the comparison tubes is very high, the working point of the comparison tubes is substantially independent of the absolute value of the input voltages. The resistance may consist of a screen-grid tube, for example, a pentode or may consist of a resistance lamp such as an iron filament ballast lamp, for example.

In many cases it is desirable that the polarity of the control-voltage of the relay circuit should remain the same, in spite of the difference between the polarity of the potentials to be compared. This is inter alia of importance in order to prevent a relay from being magnetized in opposite direction and from being de-energized momentarily or permanently, if the difference between the voltages to be compared is abruptly converted into a difference of opposite polarity. For this purpose the input side or the output side of the comparison circuit may be provided with a rectifying circuit arrangement, for example, a Grätz circuit.

In certain embodiments the relay circuit consists of a mechanical relay which is placed, either directly or with the interposition of a rectifying tube, in the output circuit of the comparison circuit.

The operation of the device is improved by biasing the rectifier circuit, so that a more sharply defined threshold is ensured.

The sensitivity of the device may be increased by constructing the relay circuit to form a modulator circuit which is controlled by the difference between the anode voltages of the comparison tubes. This circuit converts the variation of the difference between the anode voltages into a variation of the amplitude of an alternating voltage which, subsequent to amplification and rectification, controls a relay.

The output voltage of the comparison circuit may alternatively control the frequency of the oscillations produced by a generator, the oscillations produced being fed to a frequency discriminator, whose output voltage may, subsequent to amplification and rectification, control a relay.

In further embodiments of the device according to the invention, the relay circuit is controlled by the potential in a point of the output circuit of the comparison tubes such that the potential of this point only depends upon the difference between the input voltages and not upon their absolute values. If the common cathode resistance has a very high value and is, for example a screen-grid tube, the total current of the comparison tubes is substantially constant. In the state of voltage equilibrium each tube conveys half this current through its anode resistance, so that the potentials of the anodes are also substantially equal.

The control-potential may then be taken from a point of the anode circuit of one of the comparison tubes, if a Grätz' circuit is included at the input side of the comparison circuit or from a point which is connected, by way of blocking layer cells, to corresponding points of the anode circuits.

If the cathode resistance is not so high as to render the total anode current of the tubes constant, the control-potential may be taken off from a voltage divider connected between the cathodes of the comparison tubes and one of the anodes, or from a voltage divider connected between the cathodes and a point connected to the anode circuits by way of blocking-layer cells.

This potential may then be used to control a direct-voltage amplifier or a "trigger" circuit.

In order that the invention may be more clearly understood and readily carried into effect, several embodiments will now be described by way of example with reference to the accompanying drawings, in which the embodiments are represented diagrammatically and in a simplified form and in which.

Figure 4:
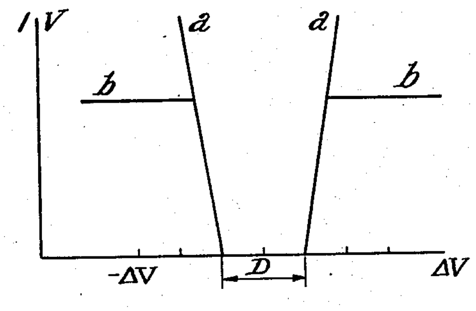
Figure 9:
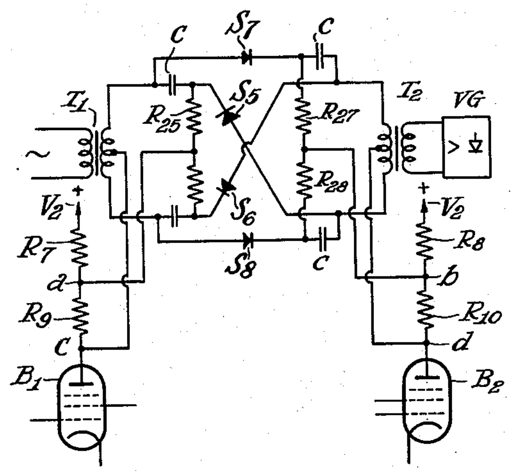
Figures 5, 11:
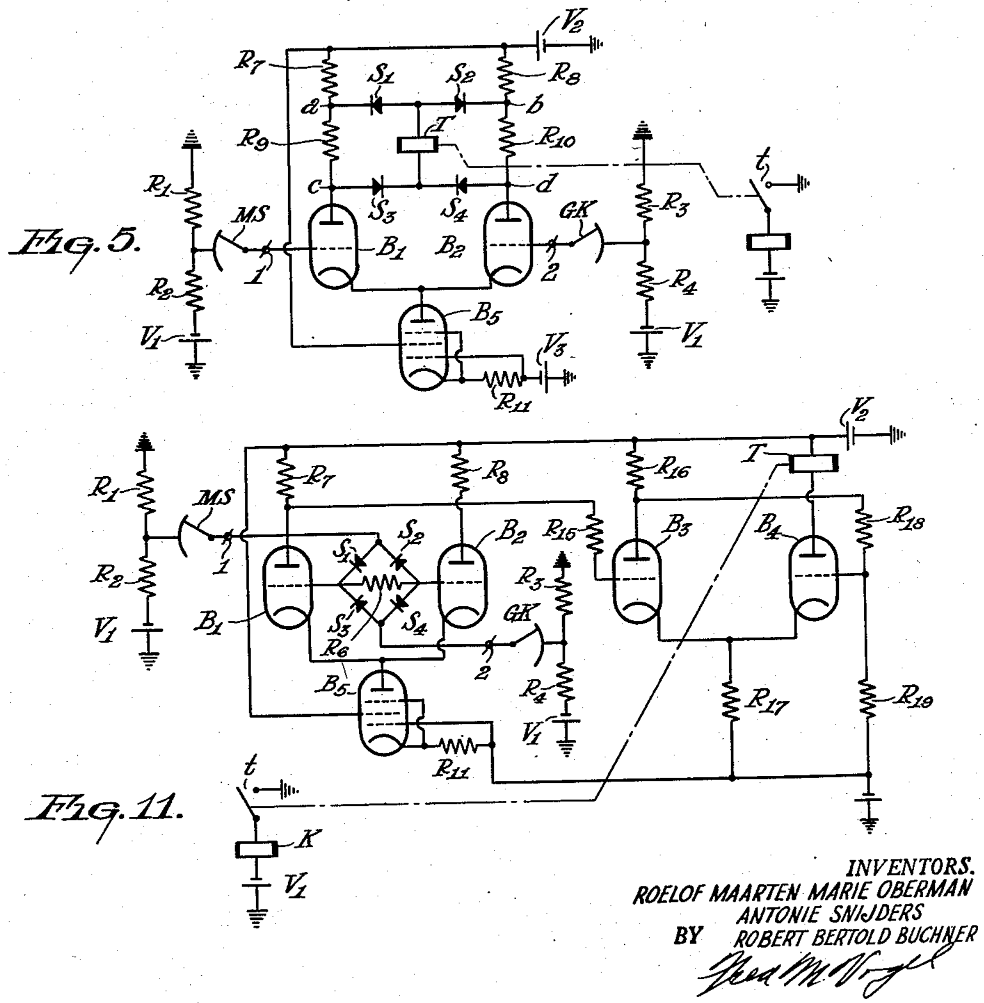
Figure 6:
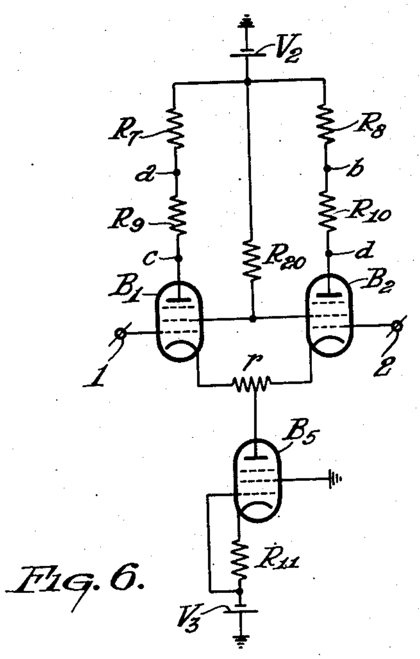
Figure 7:
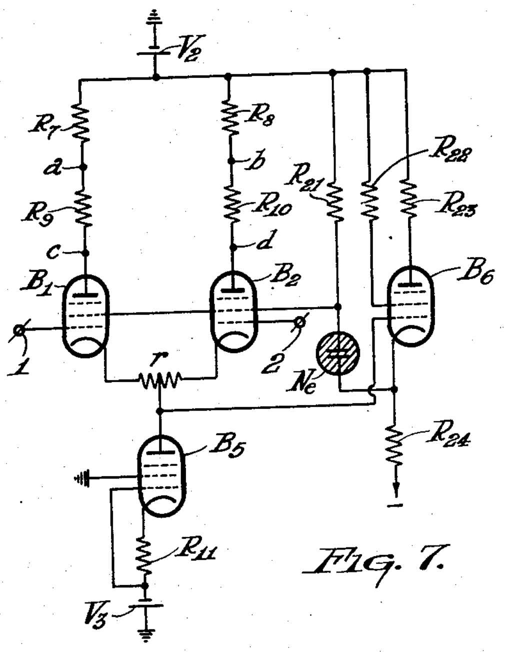
Figures 8, 10, 12, 13:
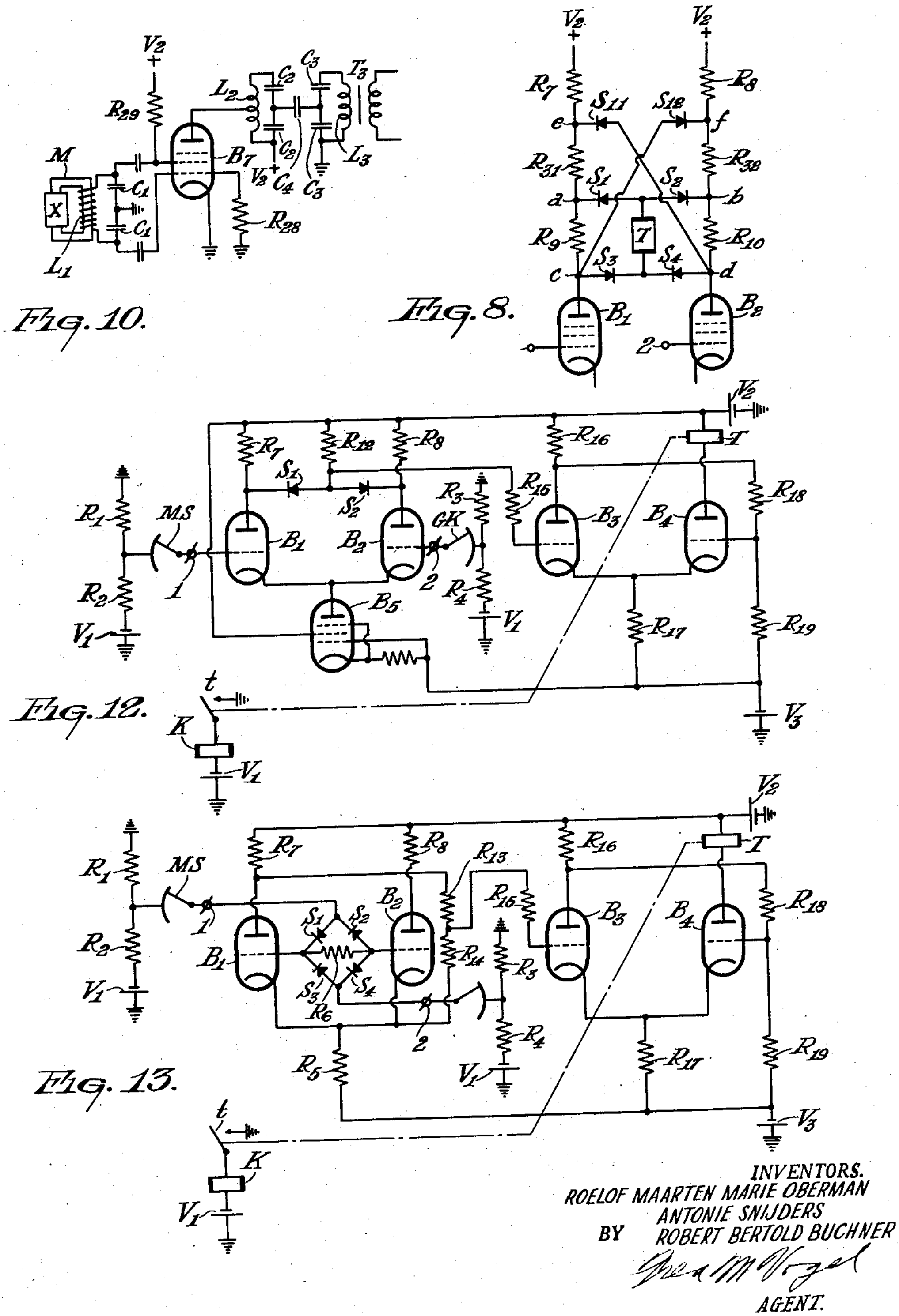

Fig. 4 serves for further explanation of the operation of certain of the circuit-arrangements;

Fig. 5 illustates a method of producing a threshold;

Fig. 6 shows a further detailed embodiment of the circuit-arrangement represented in Fig. 5;

Figs. 7 and 8 relate to devices in which pentodes are used in the comparison circuit;

Fig. 9 shows a circuit-arrangement in which the relay circuit is constructed in a manner such that the direct-voltage criterion in the output of the comparison circuit is converted into an alternating-voltage criterion, whilst obtaining a threshold;

Fig. 10 shows a relay circuit in which the frequency of a generator is varied with the use of the direct-voltage output criterion; and Figs. 11 to 14 relate to devices in which a relay is placed in a trigger circuit controlled by the comparison circuit.

Figure 1:
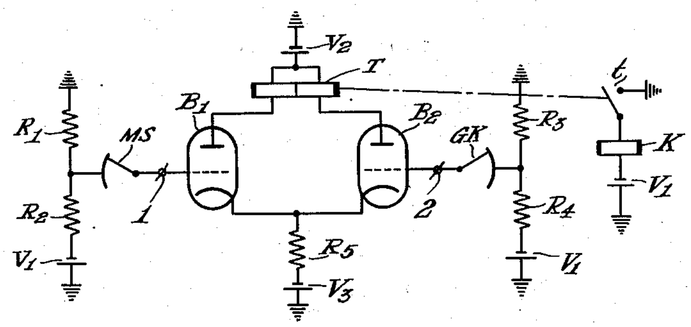
Fig. 1 shows a device in which a mechanical relay is placed directly in the output circuit of the comparison circuit.

Referring to Fig. 1, the reference GK designates a selector switch, for example a motor selector, which is actuated upon energisation of a rotary magnet K. The output contacts which are brushed by the testing wiper of the switch, are marked by different potentials which are taken from voltage dividers $R_3$, $R_4$ and may, for example, have values between zero and −60 v. with voltage intervals of 2 v.

During the movement of the switch the successive marking voltages of point 2 are compared, by a zero-switch, with the voltage of a point 1 of a marking switch MS, which is adjusted in accordance with the number to be selected.

The zero-switch comprises two discharge tubes $B_1$ and $B_2$, which are triodes in the embodiment shown.

The tubes are fed from batteries $V_2$ and $V_3$, the latter of which should have such a voltage such as to prevent both tubes from being cut off at the most negative values of the input criterion. The supply currents to further zero switches may be taken from the same batteries.

The common cathode circuit of the tubes comprises a high resistance $R_5$ and the anode circuits of the tubes include the respective windings of a differential relay T. The value of the resistance $R_5$ is such that the tubes $B_1$ and $B_2$ continue to operate on a suitable part of their characteristic curves, if the potential of points 1 and 2 are identically varied between zero and −60 v. Preferably, the resistance should be of such a value that when the difference between the input potentials causes one of the tubes to be cut off while the other tube has its maximum grid potential (zero v.), the tube conveying the largest current is not yet grid-current controlled, so that no current traverses the testing conductors.

If the input terminal 1 has a higher potential than point 2, the current traversing tube $B_1$ exceeds the current traversing tube $B_2$ and the relay T is energized, with the result that contact *t* is closed. The relay T is also energized when point 2 is positive with respect to point 1. The energisation of the relay T depends only upon the difference between the anode currents of the tubes and not upon their absolute values.

As soon as an outlet is found, whose marking potential is equal to the comparison potential adjusted in the register at point 1, the currents in the windings of relay T become identical and the relay is de-energized. By opening contact *t*, the energizing circuit of the rotary magnet K is interrupted and the switch GK is held.

By making the resistance $R_5$ high, it can be ensured that the mutual conductances of tubes $B_1$ and $B_2$ vary only a small amount, if the input potentials, in the case of voltages equality, have values between zero and −60 v. The relay T will then be de-energized at zero and at −60 v. at approximately the same value of the voltage difference.

The circuit-arrangement shown in Fig. 1 has a limitation in that if, the polarity of the potential difference between points 1 and 2 changes, as the testing wiper of GK passes to a following contact, the relay T is magnetized in opposite sense, with the result that it becomes de-energized at the transition. Due to the response of further control-apparatus in the register this may result in the switch being adjusted to a wrong outlet.

Figure 2:
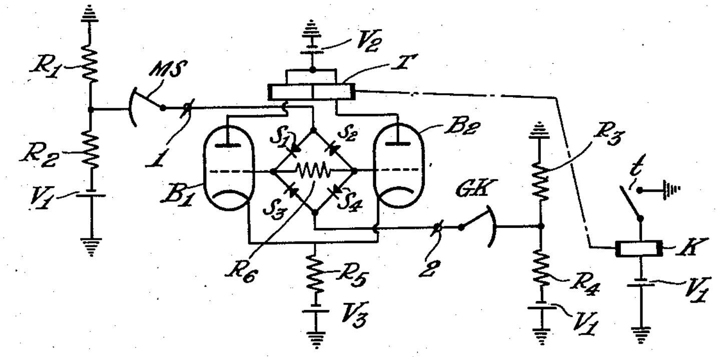
Figs. 2 and 3 show circuit-arrangements in which the input and output circuits respectively of the comparison circuit include rectifying bridges.

This disadvantage is obviated in the circuit-arrangement shown in Fig. 2. Points 1 and 2 are connected to input terminals of a Grätz circuit or rectifying bridge comprising four blocking-layer cells $S_1$ to $S_4$, the control-electrodes of tubes $B_1$ and $B_2$ being connected to the output terminals. The control-electrode of $B_1$ then constantly follows the highest of the potentials of points 1 and 2, whereas the control-electrode of $B_2$ assumes the lowest of these potentials. This results in that, in the event of inequality of the input voltages, tube $B_1$ constantly carries more current than $B_2$, irrespectively of the polarity of the voltage difference.

Figure 3:
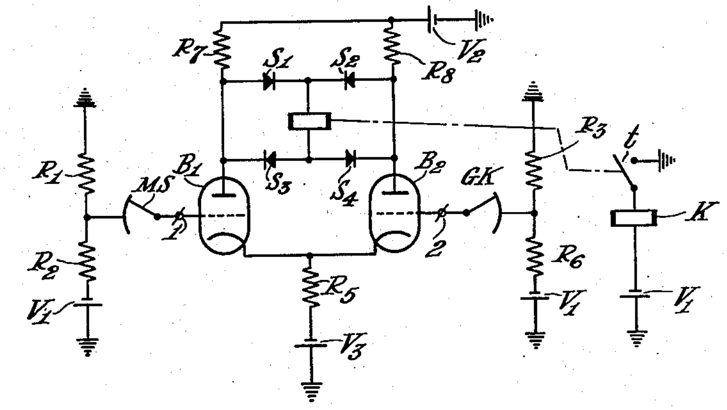

In the circuit-arrangement shown in Fig. 3, a Grätz circuit is placed in the output circuits of the comparison circuit. Use is made of a relay T having only one winding which is connected between the output terminals of the rectifying bridge $S_1$—$S_4$. In this arrangement also the direction of energisation is independent of the polarity of the voltage difference.

It is desirable that the zero switch should respond when the difference between the input voltages is smaller than a definite threshold value, for example on account of the fact that the voltages to be compared, in the case of equilibrium, need not be completely identical owing to the spread of the values of the resistances used in the voltage dividers. In excess of this threshold value the zero-switch must not become operative, since otherwise the selectors might be adjusted to a wrong position. Furthermore, the threshold value should depend as little as possible upon the absolute values of the voltages to be compared, in other words the voltage difference between points 1 and 2, below which the relay T is de-energized, should be approximately the same at a comparison potential of zero volt and at a comparison potential of −60 volts.

In the circuit-arrangements shown in Figs. 1 to 3 the threshold width i. e. the voltage range in which the relay is de-energized, is primarily determined by the mutual conductances of the tubes and the energizing and de-energizing current strengths of the relay. For a correct operation of the zero-switch, however, the influence of the relay should be as small as possible.

The threshold value is better defined in terms of the relative current variation expressed as a function of the voltage difference between the compared voltages. The variation of the current I supplied to the relay as a function of the voltage difference $\Delta V$ may, for example, be as shown by the curve *a* in Fig. 4. The current is zero if the voltage difference is within the threshold width D, and rapidly increases outside.

Such a variation of the relay current is obtained with the use of the circuit-arrangement shown in Fig. 5, in which the Grätz circuit $S_1$—$S_4$, to which relay T is connected, is supplied with bias voltages which are produced through resistances $R_9$ and $R_{10}$. Current will traverse the relay T only when the voltage difference between points 1 and 2 is such that the potential of point *d* exceeds that of point *a*, or when that of point *c* exceeds that of point *b*. The width of the threshold thus obtained is adjustable by means of resistance $R_9$, $R_{10}$.

As a testing relay use is made of a very sensitive relay.

In Fig. 5, the resistance $R_5$ of the circuit-arrangements shown in Figs. 1 to 3 is replaced by a screen-grid tube $B_5$ which may be, for example, a pentode. Since the anode current of such a tube is substantially independent of the anode voltage, the total current through tubes $B_1$ and $B_2$ will be approximately equal in all states of equilibrium. This effect may be improved further by employing negative current feedback for tube $B_5$ by providing a resistance $R_{11}$ in the cathode lead of $B_5$. If the current through $B_5$ is adjusted in such manner that each of the tubes $B_1$ and $B_2$ is capable of working at the total current without drawing grid current the input resistances of the comparison circuit, measured between terminals 1 and 2 will at least approximately be infinitely high with respect to all values of the voltages to be compared.

In the case of voltage equality, the tubes $B_1$ and $B_2$ are each adjusted to approximately the same working point, so that also the mutual conductances of the tubes and, consequently, the threshold value of the zero switch will be the same at comparison voltages of zero and −60 volts.

In the comparison circuit-arrangements shown in Figs. 6 and 7, the tubes $B_1$ and $B_2$ are also pentodes.

The use of multigrid-tubes in the comparison circuit has the advantage that the current through the tubes is less dependent upon the anode voltages and, moreover, tubes having greater mutual conductances may be used.

In Figs. 6 and 7, the rectifying circuit $S_1$ to $S_4$ of the type shown in Fig. 5 may be connected to points *a*, *b*, *c*, *d* in the anode circuits of tubes $B_1$ and $B_2$.

In the circuit-arrangement shown in Fig. 6, the screen-grids of tubes $B_1$ and $B_2$ are fed by way of a common resistance $R_{20}$. In practice, the potentials of points 1 and 2 are variable within a considerable range, for example 60 volts. The effective screen-grid voltages i. e. the voltage differences between the screen-grids and the cathodes, will also vary.

In the case of voltage equality between points 1 and 2, the total current through tubes $B_1$ and $B_2$ will be the same with respect to different values of the voltages to be compared, owing to the operation of tube $B_5$, but the control-grid voltages and screen-grid voltages will vary. This results in that, if the tube characteristic curves are not identical, the anode currents of $B_1$ and $B_2$, in the case of voltage equality between points 1 and 2, need not be equal throughout the range of the input voltages. Although as a rule the discrepancies will be comparatively small, in certain cases the tolerances imposed may be exceeded in definite cases.

In this event it is desirable that the effective screen-grid voltage should be maintained constant, so that the tubes are invariably adjusted at the same point of their characteristic curves.

In the circuit-arrangement shown in Fig. 6 this may be achieved by choosing as a screen-grid resistance an iron filament ballast lamp by which the total screen-grid current is maintained constant.

Another solution of the same problem is illustrated in Fig. 7. The screen-grids of tubes $B_1$ and $B_2$ are connected, to the positive terminal of the supply $V_2$ by way of resistance $R_{21}$ and a neon tube $N_e$ is connected between the screen-grids and the cathode of tube $B_6$. The control-grid of tube $B_6$ is connected to the cathodes of $B_1$ and $B_2$. The cathode-lead of $B_6$ comprises a high resistance $R_{24}$, with the result that this tube operates as a cathode-follower and the difference between the cathode potential of $B_6$ and the potential of the cathodes of $B_1$ and $B_2$ is substantially constant. This circuit-arrangement ensures that, in the event of bridge equilibrium, the anode currents of tubes $B_1$ and $B_2$ are practically independent of the value of the voltages to be compared.

This result would not be obtained to the same degree if the neon tube were connected directly between the screen-grids and the cathodes of $B_1$ and $B_2$, since in this case the constant emission current of $B_5$ would be distributed among tubes $B_1$, $B_2$ and the neon tube. The current flowing through the neon tube is, however, not constant, so that also the tube currents of $B_1$ and $B_2$ will vary with the value of the voltages to be compared. Experiments have revealed that the operation of the circuit-arrangement in which a neon tube is connected between the screen-grids and the cathodes is not better than in the absence of the neon tube.

With the use of the potentiometer 2 shown in Figs. 6 and 7 the bridge-equilibrium may be readjusted in such manner that, in the case of equality of the voltages across terminals 1 and 2, the currents flowing through tubes $B_1$ and $B_2$ are identical.

The circuit-arrangement shown in Fig. 8 corresponds for the greater part with that shown in Figs. 5 to 7. However, the anodes of tubes $B_1$ and $B_2$ are connected moreover, through blocking-layer cells $S_{12}$ and $S_{11}$, to a tap in the output circuit of the other tube. At a small voltage difference, all the blocking-layer cells are cut off, since all the cells are negatively biased, and no current traverses the relay. If the voltage difference increases, for example to such a degree that the potential of the anode of $B_1$ increases relatively to that of $B_2$, the rectifiers $S_3$ and $S_2$ become conductive at a definite value of the voltage difference. The current flowing through the relay increases until the potential of point $c$ becomes equal to that of point $f$, the blocking-layer cell $S_{12}$ becoming conductive and the current flowing through the relay increasing only slowly.

The variation of the current through the relay winding has approximately the form of curve $b$ shown in Fig. 4. This limiting measure has the advantage that the relay is not greatly over-magnetized at a great voltage difference, so that the relay is adapted to become rapidly de-energized when equilibrium of the zero switch is abruptly brought about.

The aforesaid circuit-arrangements exhibit the disadvantage to a greater or smaller extent that the test relay is less than normally energized. Consequently the operation periods of the relay may greatly vary. The sensitivity of the circuit arrangements is comparatively low. Furthermore, they have a limitation in that the threshold of the zero switches is not very sharp, since, upon variation of the input voltage, the slope of the current increase through the relay is determined by the mutual conductance of the discharge tubes.

The circuit-arrangements to be described hereinafter permit a sharper transition to be obtained, and the width of the threshold may be smaller.

In the arrangement shown in Fig. 9 the anode current variation of tubes $B_1$ and $B_2$ is converted into a variation of the amplitude of an alternating voltage which, subsequent to amplification and rectification, may be used for controlling the relay.

Between the secondary winding of transformer $T_1$ and the primary of transformer $T_2$, a push-pull arrangement of blocking-layer cells $S_7$—$S_8$ is connected. To the primary winding of $T_1$ is supplied an alternating voltage having a frequency of, say 10 kc./sec. from a supply (not shown). The points $a$ to $d$ correspond to points $a$ to $d$ shown in the arrangements represented in Figs. 5 to 8. Points $a$ and $b$ are connected respectively to the centres of two voltage dividers $R_{25}$, $R_{26}$ and $R_{27}$, $R_{28}$ which are connected between the blocking-layer cells. The anodes $c$ and $d$ of tubes $B_1$ and $B_2$ are connected respectively to the centres of a winding of transformers $T_1$ and $T_2$. The condensers C block the direct voltages and are proportioned so that currents of frequencies of 10 kc./sec. can pass.

The circuit-arrangement operates as follows: If the voltages to be compared at points 1 and 2 are identical, the potentials at points $a$, $b$ and $c$, $d$ respectively will also be identical. The potentials of $a$ and $b$ exceed those of $c$ and $d$, so that the rectifiers are cut off and present a high resistance. Consequently, no alternating voltage is set up across the primary terminals of $T_2$. If necessary, the capacities of the rectifiers may be balanced. In the case of a small difference between the voltages to be compared, the potential of $a$ will still exceed that of $d$ and that of $b$ will exceed that of $c$, so that the rectifiers remain cut off. If the difference consistently increases, however, for example such that the current of tube $B_1$ increases and that of $B_2$ drops, the potential of $d$ will, at a given instant, exceed that of $a$, so that the rectifiers $S_5$ and $S_6$ will become conductive and an alternating voltage will be set up across the terminals of $T_2$. This alternating voltage may be amplified and rectified by the device VG, and the rectified current is then capable of controlling the relay.

If the voltage difference between terminals 1 and 2 is caused to vary in opposite sense, the rectifiers $S_7$ and $S_8$ will ultimately become conducting, with the result that, an alternating voltage will be fed to $T_2$, likewise by way of the rectifiers.

The variation of the alternating voltage across the terminals of $T_2$, as a function of the voltage difference $\Delta$ V between the terminals 1 and 2, is represented by curve $a$ in Fig. 4. The threshold width is variable by means of $R_9$ and $R_{10}$.

In a further indication arrangement according to the invention, a control current taken from the comparison circuit varies the frequency of a high-frequency generator. The high frequency alternating voltage of variable frequency is passed through a discriminator arrangement and is then rectified. Fig. 10 shows an embodiment using this method.

The first three electrodes of generator tube $B_7$ are placed in a Colpits generator connection, the frequency of which is determined by the circuit comprising condensers $C_1$ and inductance $L_1$. The frequency of the generator may, for example, be 500 kc./sec. The inductance $L_1$ comprises a high frequency iron core M, the permeability of which is variable by passing a direct current through an energizing winding X provided on the core, which winding is decoupled in a known manner for high-frequency currents relatively to the inductance $L_1$.

The energizing winding X may be substituted for relay T in the circuit-arrangements shown in Figs. 3, 5 and 8.

The current traversing the winding X may be limited as shown in Fig. 8. In the case of variation of the voltage difference $\Delta$ V between the terminals 1 and 2, the current through the energizing winding X varies in accordance with curve *b* shown in Fig. 4.

The frequency variation of the generator exhibits a similar curve form. Similarly to the circuit-arrangements shown in Figs. 5 to 7, the threshold width is variable by means of resistances $R_9$ and $R_{10}$. The anode circuit of the generator tube $B_7$ of Fig. 10 includes a discriminator circuit which comprises a band-pass filter constituted by the circuits $L_2C_2C_2$ and $L_3C_3C_3$. The circuits are capacitatively coupled by condenser $C_4$. The inductance $L_3$ constitutes the primary winding of a high-frequency transformer $T_3$, the secondary of which is included in a rectifying circuit (not shown). The rectifier voltage is capable of energizing a relay or of controlling an amplifying tube. The band-pass filter is tuned to 500 kc./s. and the bandwidth should be chosen to exceed the frequency range through which the natural frequency of the generator may vary, owing to fluctuations of supply voltages and the like.

The circuit arrangement operates as follows: If the difference between the voltages to be compared is smaller than the threshold value of the comparison circuit, no current flows through the energizing winding X and the frequency of the generator is equal to 500 kc./s. If the voltage difference increases beyond the threshold value, the frequency of the generator will change over rapidly owing to the premagnetization of the iron core M. It has been found possible in practice to obtain a frequency variation of 100 kc./s. per volt of voltage variation between terminals 1 and 2. The frequency then falls beyond the range of transmission of the band-pass filter, so that the output voltage is reduced to a very low value, the flank width of the threshold being only a few millivolts.

As advantages of the circuit-arrangement shown in Fig. 10 over that shown in Fig. 9, the fact may be mentioned that the high-frequency voltage can be produced in situ and the possibility of smoothing the high-frequency rectifying voltage by simple means.

A very sharp threshold effect of the zero-switch is ensured if the test relay T is included in a trigger circuit which is controlled by the comparison circuit. Fundamentally, this trigger circuit may be of any known type. The trigger circuit used in the zero-switches shown in Figs. 11 to 14 is particularly suitable for the purpose aimed at, since the problem of supply has been solved in a simple manner.

The trigger comprises two tubes $B_3$ and $B_4$. The common cathode circuit includes a high resistance $R_{17}$. The anode of $B_3$ is fed by way of a resistance $R_{16}$, and the test relay T is included in the anode circuit of $B_4$. The control-grid of $B_4$ is connected to a point of the voltage divider $R_{18}$—$R_{19}$ connected between the anode of $B_3$ and the negative terminal of a battery $V_3$. The control-voltage of the trigger is supplied to the control-grid of $B_3$.

If the control-grid of $B_3$ has a comparatively low potential, tube $B_3$ is cut off and tube $B_4$ is conductive, so that relay T is energized. If the potential of the control-grid is caused to increase, $B_3$ becomes conductive at a definite value. $B_3$, the control-grid potential of $B_4$ decreases materially and tube $B_4$ is abruptly cut off completely. This transition is very sharp.

The circuit-arrangements shown in Figs. 11 to 14 differ in the manner in which the control-voltage for the trigger circuit is taken from the output of the comparison circuit. In each circuit-arrangement the control-voltage is determined by the anode potential of that tube $B_1$ or $B_2$ which carries the highest current.

In the circuit-arrangement shown in Fig. 11 the control-grid of $B_3$ is connected, by way of a resistance $R_{15}$ which limits any grid current, to the anode of tube $B_1$. Similarly to the arrangement shown in Fig. 2, the control-grids of the comparison tubes are connected, by way of blocking-layer cells $S_1$—$S_4$, to points 1 and 2, to which the voltages to be compared are supplied. The blocking-layer cells are polarized in such manner that the control-grid of $B_1$ invariably assumes the highest potential, and the control-grid of $B_2$ invariably assumes the lowest potential of points 1 and 2.

By the pentode $B_5$ placed in the common cathode lead of $B_1$ and $B_2$ the total emission current of tubes $B_1$ and $B_2$ is maintained constant to a very high degree of approximation. In each state of voltage equality between zero and —60 v., the currents through resistances $R_7$ and $R_8$ will, consequently, have the same value. Hence the potential of the anode of $B_1$ will be the same, irrespective of the absolute value of the input potentials of points 1 and 2.

The resistances of the trigger circuit are chosen such that, in the case of equilibrium, tube $B_3$ of the trigger circuit is conductive and tube $B_4$ is cut off, the testing relay T thus being de-energized.

If the potential difference between 1 and 2 increases, the anode potential of $B_1$ drops. At a definite value of the potential difference, $B_3$ is abruptly cut off and $B_4$ made conductive, the testing relay being energized.

Since, in the case of voltage equilibrium, the mutual conductances of tubes $B_1$ and $B_2$ do not depend upon the absolute values of the voltages to be compared, the threshold width of the zero switch is also constant.

In the circuit-arrangement shown in Fig. 12, the control grids of $B_1$ and $B_2$ are connected directly to points 1 and 2, the control-grid of tube $B_3$ of the trigger circuit being connected, by way of blocking-layer cells $S_1$ and $S_2$, to the anodes $B_1$ and $B_2$. A resistance $R_{12}$ is connected between the common point *a* and the source of high-potential. The blocking-layer cells are polarized in such manner that the control-grid of $B_3$ follows the highest of the anode potentials of $B_1$ and $B_2$.

Figure 14:
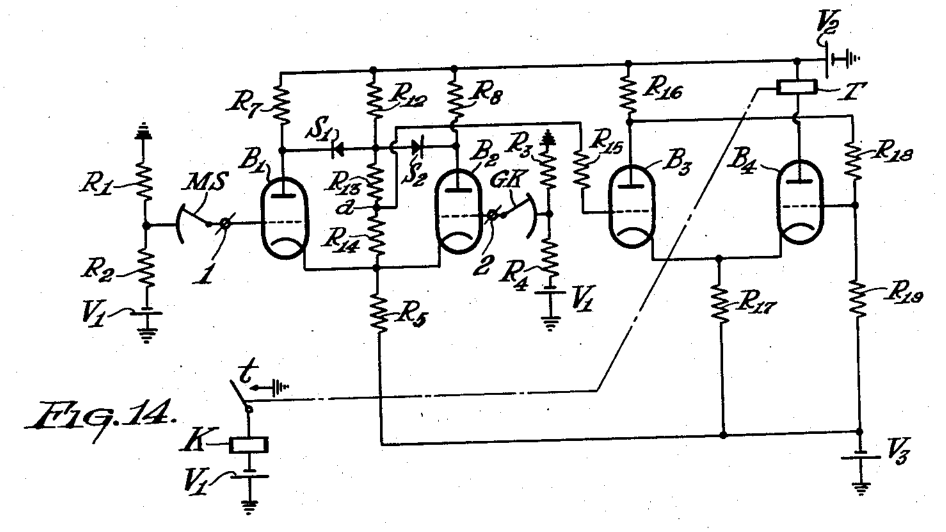

The circuit-arrangements of Figs. 13 and 14 correspond for the greater part with those shown in Figs. 11 and 12. The pentode $B_5$, however, is replaced by a resistance $R_5$. The total emission current of $B_1$ and $B_2$ depends to a certain extent upon the absolute values of the input voltages. If the potentials of points 1 and 2 are caused to increase equally, the anode potentials of $B_1$ and $B_2$ drop and the potential of the cathodes increases. A voltage divider placed between the anode and the cathode will, consequently, have a point, at which the potential does not vary.

In the circuit-arrangement shown in Fig. 13 the control-grid $B_3$ is connected to point *a* of the voltage divider $R_{13}$, $R_{14}$ between the anode of $B_1$ and the cathodes of $B_1$ and $B_2$, whereas in the circuit-arrangement shown in Fig. 14 the voltage divider $R_{13}$, $R_{14}$ is connected between the common point of the blocking-layer cells $S_1$, $S_2$ and the cathodes. By a suitable choice of the tapping point $a$ it is achieved that the threshold width of the zero switches is constant. The position of point $a$ does not exactly correspond with point $k$, since the mutual conductances of the tubes also depend to a certain extent upon the absolute value of the input voltages.

If, in the circuit-arrangements shown in Figs. 11 to 14, the polarity of the blocking-layer cells is reversed, the control-grid of $B_3$ assumes the lowest of the anode potentials of $B_1$ and $B_2$. If the resistances of the circuits are chosen such that, in the case of equilibrium, tube $B_3$ is cut off and $S_4$ is conductive, the testing relay T will abruptly be de-energized with an increase in absolute value of the voltage difference between 1 and 2 beyond a definite threshold value. Consequently, the operation of the circuit-arrangement is reciprocal with respect to that of preceding cases.

What we claim is:

1. In an automatic signalling system, testing apparatus for comparing the relative values of two input potentials, one of which is a marking potential and the other of which is a comparison potential, to produce a control voltage depending on the difference therebetween, said control voltage governing a relay actuating a selector switch, said apparatus comprising a relay, a pair of electron discharge tubes provided with a cathode, a control electrode and an anode, a common cathode circuit for said tubes including a resistance element having a relatively high value, means to impress a direct voltage across each of said tubes between the anode thereof and the common cathode circuit, means to apply said input potentials to the respective grids of said tubes, means to obtain the control voltage from the anodes of said tubes, and means to supply said control voltage to said relay to govern the operation thereof.

2. In an automatic signalling system, testing apparatus for comparing the relative values of two input potentials, one of which is a marking potential and the other of which is a comparison potential, to produce a control voltage for governing of a relay actuating a selector switch when the input potentials are of substantially like magnitude, said apparatus comprising a relay, a pair of electron discharge tubes provided with a cathode, a grid and an anode, said cathodes being interconnected, a resistance element having a relatively high value, means to impress a direct voltage across each of said tubes between the anode thereof and through said element to said interconnection, means to apply said input potentials to the respective grids of said tubes whereby a control voltage is developed at the anodes thereof, and means coupling the relay to the anodes of said tubes whereby said control voltage is supplied to said relay.

3. Apparatus, as set forth in claim 2, wherein said resistance element is constituted by a third discharge tube which further includes a screen grid electrode, said direct voltage being impressed on the interconnection through said third discharge tube, the anode of said third tube being connected to said interconnection.

4. In an automatic signalling system, testing apparatus for comparing the relative values of two input potentials, one of which is a marking potential and the other of which is a comparison potential, to produce a control voltage for affecting the operation of a relay actuating a selector switch when the input potentials are of substantially like magnitude, said apparatus comprising a pair of electron discharge tubes provided with a cathode, a grid and an anode, a third electron discharge tube further including a screen grid, the cathodes of both said first and second tubes being connected to the anode of said third tube, means to impress a direct voltage between the anode of the first tube and the cathode of the third tube and between the anode of said second tube and the cathode of said third tube, means to impress a direct voltage between the screen grid of the third tube and the cathode thereof, means to bias the grid of said third tube relative to the cathode thereof, means to apply the input potentials to the respective grids of said first and second tubes whereby a control voltage is developed between the anodes thereof, and means coupling the relay between the anodes of said first and second tubes whereby said control voltage is supplied to said relay.

5. Apparatus, as set forth in claim 4, further including a negative feedback resistance in the cathode circuit of said third tube.

6. In an automatic signalling system, testing apparatus for comparing the relative values of two input potentials, one of which is a marking potential and the other of which is a comparison potential, to produce a control voltage for governing the operation of a relay actuating a selector switch when the input potentials are of substantially like magnitude, said apparatus comprising a relay, a pair of electron discharge tubes provided with a cathode, a grid and an anode, a potentiometer having a movable tap connected between the cathodes of said tubes, a resistance element having a relatively high value and having one end thereof connected to said tap, means to impress a direct voltage across each of said tubes between the anode thereof and the other end of said element, means to apply said input potentials to the respective grids of said tubes whereby a control voltage is developed at the anodes thereof, and means coupling said relay to the anodes of said tubes whereby said control voltage is supplied to said relay.

7. In an automatic signalling system, testing apparatus for comparing the relative values of two input potentials, one of which is a marking potential and the other of which is a comparison potential, to produce a control voltage governing the operation of a relay actuating a selector switch when the input potentials are of substantially like magnitude, comprising a relay, first, second and third electron discharge tubes each provided with a cathode, a grid, a screen grid and an anode, the cathodes of said first and second tubes being connected to the anode of said third tube, means to impress a direct voltage between the anode of the first tube and the cathode of the third tube and between the anode of the second tube and the cathode of the third tube, a resistance, means to impress a direct voltage on the screen grid of the first and second tubes through said resistance, a fourth electron discharge tube having a cathode, a control electrode and an anode, means to impress a direct voltage between the anode and cathode of said fourth tube, a voltage regulating element connected between the cathode of the fourth tube and the screen grids of said first and second tubes, means connecting the control electrode of the fourth tube to the anode of said third tube, means to apply the input potentials to the respective grids of the first and second tubes whereby a control voltage is developed at the anodes thereof, and means coupling the relay to the anodes of said first and second tubes whereby said control voltage is supplied to said relay.

8. In an automatic signalling system, testing apparatus for comparing the relative values of two input potentials, one of which is a marking potential and the other of which is a comparison potential, to produce a control voltage, said apparatus comprising a differential electro-magnetic relay having two windings to actuate a selector switch, a pair of electron discharge tubes provided with a cathode, a grid and an anode, said cathodes being interconnected, a resistance element having a relatively high value, a direct voltage source having its negative terminal connected through said element to said interconnection and having its positive terminal connected through the respective windings of said relay to the anodes of said tubes, and means to apply said input potentials to the respective grids of said tubes whereby said control voltage is supplied to said relay.

9. In an automatic signalling system, testing apparatus for comparing the relative values of two input potentials, one of which is a marking potential and the other of which is a comparison potential, to produce a control voltage governing a relay actuating a selector switch, said apparatus comprising a relay, a pair of electron discharge tubes provided with a cathode, a control electrode and an anode, said cathodes being interconnected, a resistance element having a relatively high value, means to impress direct voltages across each of said tubes between the anode thereof and through said element to said interconnection, a rectifying bridge having input and output diagonals, the output diagonals being connected to the respective grids of said tubes, means to apply said input potentials to the input diagonals of said bridge, means to obtain the control voltage from the anodes of said tubes, and means to supply said control voltage to said relay to govern the operation thereof.

10. In an automatic signalling system, testing apparatus for comparing the relative values of two input potentials, one of which is a marking potential and the other of which is a comparison potential, to produce a control voltage, said apparatus comprising an electro-magnetic relay having a winding to actuate a selector switch, a pair of electron discharge tubes provided with a cathode, a grid and an anode, a resistance element having a relatively high value and having one end thereof connected to the cathodes of said tubes, means to impress a direct voltage across each of said tubes between the anode thereof and the other end of said element, means to apply said input potentials to the respective grids of said tubes, a rectifying bridge having input and output diagonals, the input diagonals of said bridge being connected to the anodes of said tubes, and means coupling the winding of said relay to the output diagonals of said bridge.

11. In an automatic signalling system, testing apparatus for comparing the relative values of two input potentials, one of which is a marking potential and the other of which is a comparison potential, to produce a control voltage for governing a relay actuating a selector switch, said apparatus comprising a pair of electron discharge tubes provided with a cathode, a grid and an anode, a resistance element having a relatively high value and having one end thereof connected to the cathodes of said tubes, means to impress a direct voltage across each of said tubes between the anode thereof and the other end of said resistance element, means to apply said input potentials to the respective grids of said tubes, a voltage divider connected between the anode of one of said tubes and said one end of said element, and means to derive the control voltage from a point on said divider, and means to supply said control voltage to said relay to govern the operation thereof.

12. In an automatic signalling system, testing apparatus for comparing the relative values of two input potentials, one of which is a marking potential and the other of which is a comparison potential, to produce a control voltage governing a relay actuating a selector switch, said apparatus comprising a pair of electron discharge tubes provided with a cathode, a control electrode and an anode, said cathodes being interconnected, a resistance element having a relatively high value, means to impress a direct voltage across each of said tubes between the anode thereof and through said element to said interconnections, a pair of rectifying devices serially-connected in opposing polarity between the anodes of said tubes, a voltage divider connected between the junction of said devices and said interconnection, means to derive the control voltage from a point in said divider, means to impress said input potentials to the respective grids of said tubes, and means to supply said control voltage to said relay to govern the operation thereof.

13. In an automatic signalling system, testing apparatus for comparing the relative values of two input potentials, one of which is a marking potential and the other of which is a comparison potential, to produce a control voltage for governing the operation of an electro-magnetic relay having a winding to actuate a selector switch, said apparatus comprising a pair of electron discharge tubes provided with a cathode, a grid and an anode, a common cathode circuit for said tubes including a resistance element having a relatively high value, means to impress a direct voltage across each of said tubes between the anode thereof and the common cathode circuit, means to apply said input potentials to the respective grids of said tubes, means to obtain the control voltage from the anode of at least one of said tubes, a trigger circuit including a pair of electron discharge devices provided with a cathode, a control electrode and a plate, said trigger circuit having two conditions of equilibrium where in one condition one device is conductive and the other is non-conductive and in the other condition wherein the other device is conductive and the one device non-conductive, means to apply said control voltage to the control electrode of one of said devices to trigger said device, and means coupling the winding of said relay to the plate of the other of said devices whereby the relay is energized when the other device is rendered conductive.

14. In an automatic signalling system, testing apparatus for comparing the relative values of two input potentials, one of which is a marking potential and the other of which is a comparison potential, to produce a control voltage for governing the operation of a relay actuating a selector switch, said apparatus comprising a relay, a pair of electron discharge tubes provided with a cathode, a grid and an anode, a resistance having a relatively high value and having one end thereof connected to the cathodes of said tubes, means to impress a direct voltage across each of said tubes between the anode thereof and the other end of said element, means to apply said input potentials to the respective grids of said tubes, an alternating-current source, a push-pull modulator coupled to said alternating current source, means to control said push-pull modulator in accordance with the control voltage developed at the anodes of said tubes, a rectifying circuit coupled to the output of said modulator, and means coupling said relay to the output of said rectifying circuit whereby said control voltage is supplied to said relay.

15. In an automatic signalling system, testing apparatus for comparing the relative values of two input potentials, one of which is a marking potential and the other of which is a comparison potential, to produce a control voltage for governing the operation of a relay actuating a selector switch, said apparatus comprising a relay, a pair of electron discharge tubes provided with a cathode, a grid, and an anode, a resistance element having a relatively high value for having one end thereof connected to the cathodes of said tubes, means to impress a direct voltage across each of said tubes between the anode thereof and the other end of said resistance element, means to apply said input potentials to the respective grids of said tubes whereby a control voltage is produced at the anodes thereof, a wave generator, means to vary the frequency of said generator in accordance with the value of said control voltage, a frequency discriminator coupled to the output of said generator to produce an output voltage depending on the frequency thereof, and means coupling said relay to the output of said frequency discriminator to govern the operation thereof.

16. In an automatic signalling system, testing apparatus for comparing the respective values of two input potentials, one of which is a marking potential and the other of which is a comparison potential, to produce a control voltage for governing the operation of a relay having a winding to actuate a selector switch, said apparatus comprising a relay, first and second electron discharge tubes provided with a cathode, a grid and an anode, a resistance element having a relatively high value and having one end thereof connected to the cathodes of said tubes, first, second and third serially-connected resistors, means to apply a direct voltage across said first tube between one end of said resistance element and the anode thereof through said first, second and third serially-connected resistors, fourth, fifth and sixth serially-connected resistors, means to impress a direct voltage across said second tube between said other end of said element and the anode thereof through said third, fourth and fifth resistors, a first pair of rectifiers connected in series opposition between the anodes of said tubes, a second pair of rectifiers connected in series opposition reversely with respect to said first pair between the junction of said second and third resistors and the junction of said fifth and sixth resistors, a third pair of rectifiers one of which is connected between the anode of the first tube and the junction of said fourth and fifth resistors and the other of which is connected between the anode of said second tube and the junction of said first and second resistors, means to apply said input potentials to the respective grids of said first and second tube, and means coupling said relay winding between the junction of the rectifiers in the first pair and the junction of the rectifiers in the second pair.

References Cited in the file of this patent

UNITED STATES PATENTS

| Number | Name | Date |
|---|---|---|
| Re. 22,794 | Deakin | Oct. 1, 1946 |
| 2,354,682 | Herbig | Aug. 1, 1944 |
| 2,454,781 | Deakin | Nov. 30, 1948 |
| 2,462,074 | Deakin | Feb. 22, 1949 |
| 2,470,240 | Crosby | May 17, 1949 |
| 2,492,943 | White | Dec. 27, 1949 |

FOREIGN PATENTS

| Number | Country | Date |
|---|---|---|
| 583,574 | Great Britain | Dec. 20, 1946 |